(12) United States Patent
Lawrenson et al.

(10) Patent No.: US 11,796,640 B2
(45) Date of Patent: Oct. 24, 2023

(54) TIME-OF-FLIGHT DEPTH CAMERA WITH LOW RESOLUTION PIXEL IMAGING

(71) Applicant: TRUMPF Photonic Components GmbH, Ulm (DE)

(72) Inventors: Matthew John Lawrenson, Eindhoven (NL); Joachim Wilhelm Hellmig, Ulm (DE); Holger Joachim Moench, Ulm (DE); Nicholas Walker, Eindhoven (NL); Jan Jasper Van Den Berg, Eindhoven (NL)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 763 days.

(21) Appl. No.: 16/805,887

(22) Filed: Mar. 2, 2020

(65) Prior Publication Data
US 2020/0217931 A1    Jul. 9, 2020

Related U.S. Application Data

(63) Continuation of application No. PCT/EP2018/073219, filed on Aug. 29, 2018.

(30) Foreign Application Priority Data

Sep. 1, 2017 (EP) .................... 17188935

(51) Int. Cl.
   G01S 7/481    (2006.01)
   G01S 17/894   (2020.01)
   G01S 7/484    (2006.01)

(52) U.S. Cl.
   CPC ............ *G01S 7/4815* (2013.01); *G01S 7/484* (2013.01); *G01S 17/894* (2020.01)

(58) Field of Classification Search
   CPC ....... G01S 17/894; G01S 7/4815; G01S 7/484
   See application file for complete search history.

(56) References Cited

U.S. PATENT DOCUMENTS

2012/0038903 A1    2/2012  Adkins et al.
2012/0056982 A1    3/2012  Katz et al.
(Continued)

FOREIGN PATENT DOCUMENTS

CN    102385237 A    3/2012
CN    105115445 A    12/2015
(Continued)

OTHER PUBLICATIONS

Duarte, et al. "Structured Compressed Sensing: From Theory to Applications," *Institute of Electrical and Electronics Engineers* (Jul. 3, 2011).

(Continued)

*Primary Examiner* — Mohammed S Rahaman
(74) *Attorney, Agent, or Firm* — LEYDIG, VOIT & MAYER, LTD.

(57) ABSTRACT

A time-of-flight depth camera includes a VCSEL array, an optical arrangement, an evaluator and a light detector having at least one detector pixel. The VCSEL array or the optical arrangement are arranged to provide different illumination patterns in a reference plane in a defined field-of-view of the time-of-flight depth camera. The light detector is arranged to detect the different illumination patterns and the evaluator is arranged to reconstruct a depth image of the field of view with a resolution of a predefined number of pixels P based on the detected different illumination patterns. A number of the detected different illumination patterns N is at least 5% of the predefined number of pixels P, preferably at least 10% of the predefined number of pixels P and most preferred at least 20% of the predefined number of pixels P.

11 Claims, 8 Drawing Sheets

(56) References Cited

U.S. PATENT DOCUMENTS

| | | | |
|---|---|---|---|
| 2013/0088726 A1* | 4/2013 | Goyal | G01S 17/10 |
| | | | 356/634 |
| 2013/0194787 A1* | 8/2013 | Geske | H01S 5/4087 |
| | | | 362/231 |
| 2015/0097947 A1* | 4/2015 | Hudman | G02B 19/0057 |
| | | | 348/136 |
| 2015/0229912 A1 | 8/2015 | Masalkar et al. | |
| 2015/0253429 A1 | 9/2015 | Dorrington et al. | |
| 2015/0362585 A1* | 12/2015 | Ghosh | G01S 17/10 |
| | | | 250/208.1 |
| 2015/0378011 A1 | 12/2015 | Owechko | |
| 2016/0033642 A1 | 2/2016 | Fluckiger | |
| 2016/0050401 A1 | 2/2016 | Gordon | |
| 2016/0205378 A1 | 7/2016 | Nevet et al. | |
| 2017/0115497 A1* | 4/2017 | Chen | G02B 27/12 |
| 2017/0186166 A1 | 6/2017 | Grunnet-Jepsen et al. | |
| 2017/0186167 A1 | 6/2017 | Grunnet-Jepsen et al. | |

FOREIGN PATENT DOCUMENTS

| | | |
|---|---|---|
| CN | 105992960 A | 10/2016 |
| DE | 102008021465 A1 | 11/2009 |
| WO | WO 2005049840 A2 | 6/2005 |
| WO | WO 2009132761 A1 | 11/2009 |

OTHER PUBLICATIONS

Heide, et al. "Encoded Diffractive Optics for Full-Spectrum Computational Imaging," *Scientific Reports* (Sep. 16, 2016).

* cited by examiner

TIME-OF-FLIGHT DEPTH CAMERA WITH LOW RESOLUTION PIXEL IMAGING

CROSS REFERENCE TO RELATED APPLICATIONS

This application is a continuation of International Application No. PCT/EP2018/073219 (WO 2019/043052 A1), filed on Aug. 29, 2018, and claims benefit to European Patent Application No. EP 17188935.5, filed Sep. 1, 2017, the entire disclosures of which are hereby incorporated by reference herein.

FIELD

The invention relates to a time-of-flight depth camera with low resolution pixel imaging, a corresponding method of performing a time of flight measurement and to a corresponding computer program product.

BACKGROUND

Structured light projection methods are suitable to measure the three-dimensional-shape (or 3D shape) of objects. A structured light projection method which is commonly used for 3D shape measurements is known in the art as fringes projection or moire method. This known moire method usually comprises projecting a periodic light pattern, that can be the result of the interference of two coherent beams, forming a deformed line pattern on said object, and synthesizing the 3D shape of the object from said deformed lines pattern and a reference lines pattern. An application of the structured light projection technique is to measure the 3D shape of objects, mechanical pieces and machine pieces in factories and laboratories.

WO 2005/049840 A2 discloses in this respect a process and apparatus for measuring the three-dimensional shape (or 3D shape) of an object, specifically adapted to structured light projection and interferometric measuring methods.

US 2015/0362585 A1 discloses an apparatus and a method for 3-D imaging and scanning using a 2-D planar vertical-cavity surface-emitting laser (VCSEL) source configured as lightfield optical source.

Us 2017/0115497 A1 discloses a coded pattern generator comprising a surface emitting array of emitters and two optical elements for producing the coded pattern.

SUMMARY OF THE INVENTION

In an embodiment, the present invention provides a time-of-flight depth camera includes a VCSEL array, an optical arrangement, an evaluator and a light detector having at least one detector pixel. The VCSEL array or the optical arrangement are arranged to provide different illumination patterns in a reference plane in a defined field-of-view of the time-of-flight depth camera. The light detector is arranged to detect the different illumination patterns and the evaluator is arranged to reconstruct a depth image of the field of view with a resolution of a predefined number of pixels P based on the detected different illumination patterns. A number of the detected different illumination patterns (20) N is at least 5% of the predefined number of pixels P, preferably at least 10% of the predefined number of pixels P and most preferred at least 20% of the predefined number of pixels P.

BRIEF DESCRIPTION OF THE DRAWINGS

The present invention will be apparent from and elucidated with reference to the embodiments described hereinafter.

The present invention will now be described, by way of example, based on embodiments with reference to the accompanying drawings.

In the drawings:

FIG. 1 shows a principal sketch of a first pattern projector;

FIG. 2 shows a principal sketch of a first time-of-flight depth camera;

FIG. 3 shows a principal sketch of method of reconstructing a depth image;

FIG. 4 shows a principal sketch of a second pattern projector;

FIG. 5 shows a principal sketch of a third pattern projector;

FIG. 6 shows a principal sketch of a fourth pattern projector;

FIG. 7 shows a principal sketch of a second time-of-flight depth camera; and

FIG. 8 shows a principal sketch of a method of providing a depth image.

In the Figures, like numbers refer to like objects throughout. Objects in the Figures are not necessarily drawn to scale.

DETAILED DESCRIPTION OF EMBODIMENTS

Figure 1:
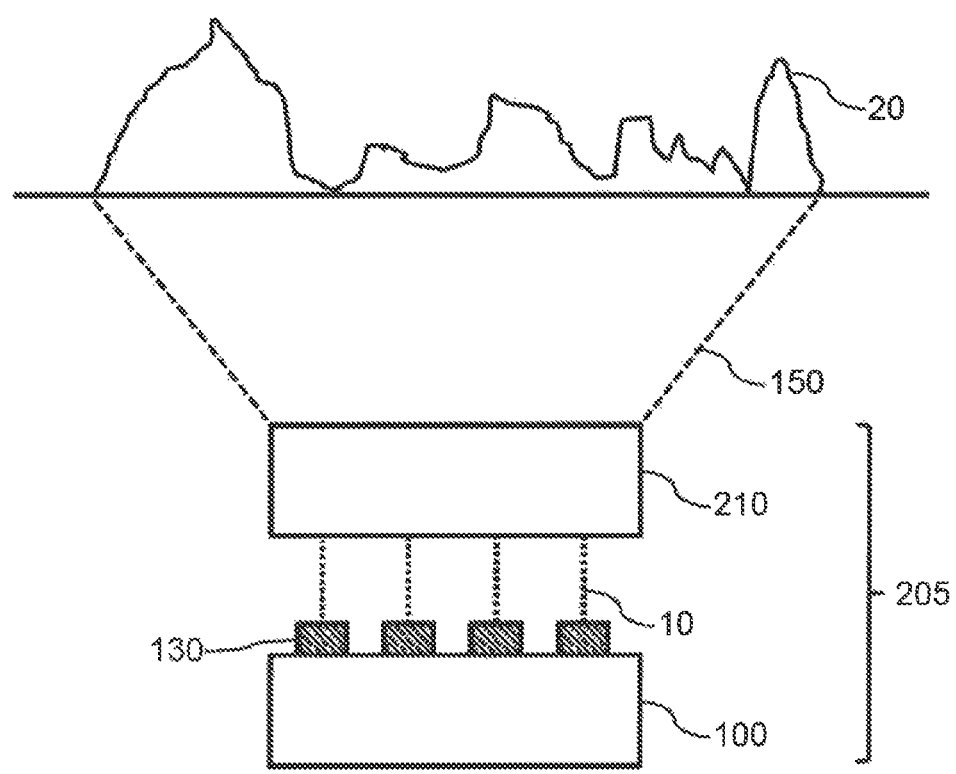

The present application describes an improved apparatus and method for providing 3-D or depth images. According to a first aspect a time-of-flight depth camera is provided. The time-of-flight depth camera comprises a VCSEL array, an optical arrangement, an evaluator and a light detector comprising at least one detector pixel. The VCSEL array and/or the optical arrangement are arranged to provide different illumination patterns in a reference plane in a defined field-of-view of the time-of-flight depth camera. The light detector is arranged to detect the different illumination patterns. The evaluator is arranged to reconstruct a depth image of the field of view with a resolution of a predefined number of pixels P based on the detected different illumination patterns. A number of the detected different illumination patterns N is at least 5% of the predefined number of pixels P, preferably at least 10% of the predefined number of pixels P and most preferred at least 20% of the predefined number of pixels P. The number of detected different illumination patterns N may be less than the predefined number of pixels P. The number of the detected different illumination patterns N may be less than 50% of the predefined number of pixels P, preferably less than 40% of the predefined number of pixels P and most preferred less than 30% of the predefined number of pixels P.

High-resolution depth images usually require a high-resolution detector. Such high-resolution detectors are, for example, single photon avalanche diodes (SPAD) in an array arrangement. The time-of-flight depth camera described above avoids such extreme solutions by splitting complexity between light detector, optical arrangement and VCSEL array. Each detector pixel of the light detector provides independent images of one illumination pattern of the field-of-view. This means that the optical arrangement and the VCSEL array provide all detected different illumination patterns if there is only one detector pixel. The number of provided illumination pattern may be reduced in case of two, three, four or more detector pixels, wherein each detector pixel detects a different illumination pattern at least of a part of illumination pattern in the field of view even if the provided illumination pattern is the same. Finally the imaging optic which is used to image the illumination pattern to the respective detector pixel determines whether each detector pixel determines a different illumination pattern of the whole scene in the field of view. The total number of detected different illumination pattern does not need to be the same as the resolution of the depth image because not each subsection of the scene provides additional information. This approach is based on the understanding that a small collection of nonadaptive linear measurements of a compressible signal or image contain enough information for reconstruction and processing. In practice this results in a time-of-flight depth camera which is a kind of inversion of a standard time of flight camera: an illuminator capable of producing a large number of (approximately) orthogonal projection patterns projected on the scene in the field-of-view is used along with a low resolution and in an extreme case single pixel camera which collects all the reflected light from the scene. The collected data is processed by a reconstruction algorithm to yield the multipixel image with the required resolution. The computer reconstruction algorithm takes the data from e.g. the single sensor pixel for each of the projected light patterns and generates the multipixel depth image of the scene in the field-of-view. An example of such an algorithm is given in the paper "Structured Compressed Sensing: From Theory to Applications"; Marco F. Duarte et al.; arXiv:1106.6224v2 28 Jul. 2011 (https://arxiv.org/pdf/1106.6224.pdf). The paper is incorporated by reference. The approach can use a significantly smaller number of patterns than pixels imaged, essentially because most images are compressible—they can be represented by a smaller amount of information than the raw pixel data—such as is exploited in image compression (for example JPEG compression). Depending on the structure of the scene in the field-of-view of the time-of-flight depth camera it may be sufficient to detect a number of different illumination patterns which correspond to only 5% of number of pixels of the depth image. This means, for example, that a 100×100 pixel depth image requires only 500 detected different illumination patterns (approximately orthogonal projection patterns). This approach may, for example, enable use of high temporal resolution (single pixel) light detectors which are due to complexity and cost not implemented as arrays.

The different illumination patterns which can be provided by means of the combination of the VCSEL array and the optical arrangement may be pseudo random illumination patterns (noise pattern).

The VCSEL array may be an addressable VCSEL array. The VCSEL array is arranged to provide different illumination patterns by addressing different VCSELs of the VCSEL array. Single VCSELs or different groups of VCSELs may be addressable such that the single VCSELs or the groups of VCSELs can be switched on or off independently by providing a corresponding driving current.

The VCSELs of the VCSEL array may be arranged in a random pattern such that the number of different illumination patterns provided by the VCSEL array is increased. A regular pattern of VCSELs (e.g. quadratic or hexagonal and the like) may have the effect that the provided illumination patterns are not sufficiently different in order to be useful for reconstruction of the depth image. The mesas of the VCSELs may therefore be distributed in a random pattern (e.g. random shifts of the mesas with respect to a regular reference pattern). This random pattern of the VCSELs may enable more unique illumination patterns if only a part of the VCSELs or group of VCSELs of the VCSEL array are simultaneously switched on (e.g. 5 VCSELs or group of VCSELs of a VCSEL array comprising 3×3 VCSELs or group of VCSELs are switched simultaneously). Randomness of the illumination patterns may furthermore be increased by random distribution of differently shaped light emission areas of the VCSELs (e.g. circular, rectangular, triangular, different size etc.).

An addressable VCSEL or VCSELs of the VCSEL array which are arranged to be addressed simultaneously are arranged to illuminate the optical arrangement such that the defined field-of-view is illuminated with the illumination patterns. Each switching state of the VCSEL array in combination with the optical arrangement may in this case be arranged to illuminate the whole scene in the field-of-view of the time-of-flight depth camera.

An addressable VCSEL or VCSELs of the VCSEL array which are arranged to be addressed simultaneously may alternatively or in addition be arranged to illuminate the optical arrangement such that a subsection of the defined field-of-view is illuminated with the illumination patterns. Two, three, four or more subsections of the defined field-of-view may cover the field-of-view. The combination of different switching states of the VCSEL array and the optical arrangement may, for example, scan different subsections of the defined field-of-view. A reconstruction of the depth image with the defined pixel resolution would in this case require providing the corresponding number of detected different illumination patterns per subsection.

The optical arrangement may, for example, comprise a replicating optical structure (e.g. prismatic structure). The replicating optical structure is arranged to replicate a light pattern provided by the VCSEL array across the illumination pattern such that the illumination pattern consists of two, three, four or more sub-illumination patterns. The illumination pattern comprises in this case a number of (essentially) identical sub-illumination patterns. A limited number of different illumination patterns which can be provided by means of the different switching states of a VCSEL array can therefore be reused. Using, for example, a checkerboard pattern of sub-illumination patterns may be beneficial if the detector comprises more than one detector pixel. An optical imaging device of the time of flight camera may be arranged to image only a part (in an extreme case only one) of the sub-illumination patterns to one detector pixel. The detector pixels enable in this case parallel processing and therefore a reduction of the reconstruction time of the depth image. It may therefore be beneficial to combine a low resolution detector with an addressable VCSEL array in order to provide a high resolution depth image with a low resolution detector in an acceptable reconstruction time.

The VCSEL array may, for example, be a VCSEL array comprising 4×4 VCSELs or groups of VCSELs (16 switchable segments). Eight of the segments may be switched simultaneously in order to provide one illumination pattern. This results in an ideal case in 12,870 different illumination patterns provided that each illumination pattern is sufficiently different (pseudorandom) from the other illumination patterns for the respective detector pixel in order to contribute to the reconstruction of the depth image. A depth image with the resolution of 160 by 160–(P=25,600 pixels) would require N=5,120 detected different illumination patterns in order to fulfill the 20% criteria mentioned above. The 4×4 VCSEL array would therefore be sufficient to provide the required number of detected different illumination patterns.

The optical arrangement may alternatively or in addition be arranged to provide at least a part of the different illumination patterns by changing an optical property of the optical arrangement. Changes of the optical properties of the optical arrangement may result in a different illumination pattern provided by the optical arrangement independent from the laser light provided by the VCSEL array.

The number of detected different illumination patterns N may be determined by the number of detector pixels D and the number of provided different illumination patterns. The number of provided different illumination patterns is given by a product V*O of a number of different illumination patterns provided by the addressable VCSEL array V and a number of different illumination patterns provided by optical arrangement O. V may be chosen between 4 and 0.7*N, preferably between 10 and 0.5*N and most preferably between 50 and Integer(square root(N))+1. O may be chosen between 2 and 0.7*N, preferably between 10 and 0.5 N and most preferably between 50 and Integer(square root(N))+1. The optical arrangement may, for example, be arranged to provide O=200 different illumination patterns (e.g. pseudo random illumination patterns) with one fixed configuration of the VCSEL array. It would in this case be sufficient that the addressable VCSEL array can provide V=26 different illumination patterns in order to provide N=5200 detected different illumination patterns even in case there is only one detector pixel in order to fulfill the 20% requirement. A VCSEL array comprising 3×3 VCSELs or groups of VCSELs would in such a case be sufficient. Such a VCSEL array could provide theoretically up to V=126 different illumination patterns if 5 segments (VCSELs or groups of VCSELs) of the 9 segments are simultaneously switched on (V=(9*8*7*6*5)/(1*2*3*4*5)). It would in this case be even sufficient that only a minor part of these different switching states of the VCSEL array can be used to provide different illumination patterns. It may therefore be possible to use a simple VCSEL array with VCSELs arranged in a regular pattern such that nearly 80% of the illumination patterns which can be theoretically provided by the VCSEL array are too similar from the perspective of the light detector in order to contribute to reconstruction of the depth image.

The optical arrangement may comprise a first optical element and a second element. The optical arrangement may be arranged to change a spatial relationship between the first optical element and the second optical element. Any kind of relative movement (distance, rotation, parallel movements, inclination . . . ) of the first and the second optical element may be used to provide different illumination patterns. Two, three, four or more optical elements may be used.

The first optical element may be a first diffractive optical element and/or the second optical element may be a second diffractive optical element. A diffractive optical element (DOE) is an optical film which has been structured on one or both surfaces with a set of microstructures whose features have lengths approximately equal to the wavelengths of the light it is implemented for. Such features produce an optical effect as a result of diffraction of the light. Controlled light spread patterns and specific optical functions such as lenses, can be implemented with DOEs. A hologram is a type of DOE. Typically, such films are formed of micron sized squares of different heights (where height differences are of the order of the wavelength of light) or small patches of microgratings. Two DOEs can be designed to generate such a set of different projection patterns when their relationship is altered using an appropriate design methodology as described in the research paper "Encoded diffractive optics for full-spectrum computational imaging"; Felix Heide et al. Scientific Reports 6; Article number: 33543 (2016); doi: 10.1038/srep33543 (https://www.nature.com/articles/srep33543). The research paper is incorporated by reference.

The advantages of this approach are the following:

There is no requirement for electronic drivers or additional active components, with the exception of the actuators used to modify the relationship of the optical elements—for example actuators capable of rotating each optical elements around their centers;

All the light from the VCSEL array is used to illuminate the scene—the optical elements redirect the light rather than extinguish it. Some light is lost in the optical elements themselves, but practical optics which use e.g. two DOEs indicate that this does not exceed 50%, and excellent design may reduce this further;

By suitable design, use of at least two DOEs can virtually eliminate high projected intensities at the zero order (a problem with single DOEs); Optical element films such as DOEs are flat and low cost and therefore the costs and complexity of the optics is not excessive.

The optical arrangement may alternatively or in addition comprise a spatial light modulator or a micromirror device for providing the different illumination patterns. The spatial light modulator may, for example, be an LCD-based spatial light modulator. The spatial light modulator may alternatively be an optical element (e.g. DOE) in combination with a distortion device (e.g. actuator or actuators) arranged to change the spatial arrangement of parts of the optical element in order to provide the different illumination patterns (e.g. bending of the DOE).

The light detector may comprise less detector pixels than the predefined number of pixels P. The light detector may, for example, comprise less than 10 detector pixels, more preferably less than 5 detector pixels and most preferably one detector pixel as described above.

According to a second aspect a method of providing a depth image from a defined field of view with a resolution of a predefined number of pixels P is provided. The method comprises the steps of:

changing an optical interaction between a VCSEL array and an optical arrangement, providing a number of different illumination patterns by changing the optical interaction, detecting the different illumination patterns, wherein the number of detected different illumination patterns N is at least 5% of the predefined number of pixels P, preferably at least 10% of the predefined number of pixels P and most preferred at least 20% of the predefined number of pixels P in a reference plane in the defined field-of-view, reconstructing the depth image of the field of view based on the detected different illumination patterns.

The method steps are necessarily performed in sequence described above.

According to a third aspect a computer program product is provided. The computer program product comprises code means which can be saved on at least one memory device of the time-of-flight depth camera in accordance with any embodiment discussed above or on at least one memory device of a device comprising the time-of-flight depth camera. The code means being arranged such that the method presented above can be executed by means of at least one processing device of the time-of-flight depth camera or by means of at least one processing device of the device comprising the time-of-flight depth camera.

The memory device or the processing device may be comprised by the time-of-flight depth camera (e.g. electrical driver, evaluator etc.) or the device comprising the time-of-flight depth camera. A first memory device and/or first processing device of the device comprising the time-of-flight depth camera may interact with a second memory device and/or second processing device comprised by the time-of-flight depth camera.

The memory device or devices may be any physical device being arranged to store information especially digital information. The memory device may be especially selected out of the group solid-state memory or optical memory.

The processing device or devices may be any physical device being arranged to perform data processing especially processing of digital data. The processing device may be especially selected out of the group processor, microprocessor or application-specific integrated circuit (ASIC).

It shall be understood that the time-of-flight depth camera and the method have similar and/or identical embodiments, in particular, as defined in the dependent claims.

It shall be understood that a preferred embodiment of the invention can also be any combination of the dependent claims with the respective independent claim.

Further advantageous embodiments are defined below.

Various embodiments of the invention will now be described by means of the Figures.

FIG. 1 shows a principal sketch of a first pattern projector 205 which can be used in a time-of-flight depth camera 200. The pattern projector 205 comprises a VCSEL array 100 comprising sixteen VCSELs 130 which are arranged in a regular rectangular pattern. The VCSELs 130 of the VCSEL array 100 are in this embodiment arranged on one common semiconductor substrate (single VCSEL array chip). The VCSEL array 100 may alternatively comprise a, three, four or more VCSEL array chips. The VCSEL array 100 is arranged such that all VCSELs 130 simultaneously emit laser light 10 to an optical arrangement 210. The optical arrangement 210 enables projection of a multitude of pseudo random illumination patterns 20 on a reference plane in a defined field-of-view by transforming the laser light to 10 to transformed laser light 150. The optical arrangement 210 comprises in this case a LCD spatial light modulator to provide the multitude (e.g. 500) of pseudo random illumination patterns 20. The LCD spatial light modulator can be controlled by means of a suitable controller (not shown).

Figure 2:
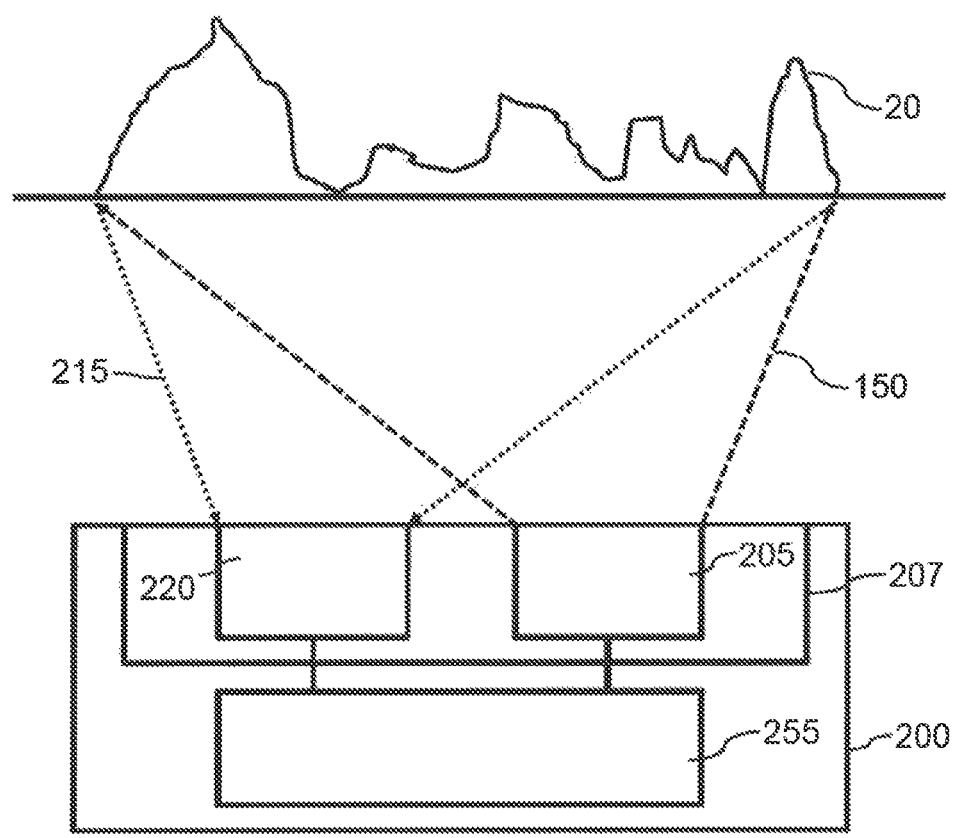

FIG. 2 shows a principal sketch of a first time-of-flight depth camera 200. The time-of-flight depth camera 200 comprises a pattern projector 205 with an addressable VCSEL array 100 comprising five hundred VCSELs 130 and a diffractive optical element (DOE) with a distortion device for providing two hundred different illumination patterns 20 in combination with one illumination pattern provided by the VCSEL array 100. The pattern projector 205 is arranged to provide 4000 different illumination patterns 20 by transforming laser light 10 to transformed laser light 150 The time-of-flight depth camera 200 further comprises a light detector 220 comprising four detector pixels and the corresponding imaging optics (not shown). The imaging optics is arranged to image reflected laser light 215 received from the scene in the field-of-view which is illuminated by means of the illumination pattern 20. The pattern projector 205 and the light detector 20 built a time-of-flight sensor module 207 which are arranged to provide up to 4*4000 detected illumination patterns. The first time-of-flight depth camera 200 further comprises an evaluator 255 which receives information with respect to the illumination pattern 20 provided in a defined moment in time and data of the respective detected illumination pattern detected by light detector 220. The evaluator 255 is arranged to reconstruct a depth image 50 by means of the information provided by the pattern projector 205 and the light detector 220 with respect to the up to 4*4000 different illumination patterns 20 determined within a predefined time period. The evaluator 255 may further comprise or be comprised by a controller arranged to control the pattern projector 205 and the detector 220. The first time-of-flight depth camera 200 may further comprise a power source (e.g. rechargeable battery) and/or an electrical interface for receiving electrical power.

Figure 3:
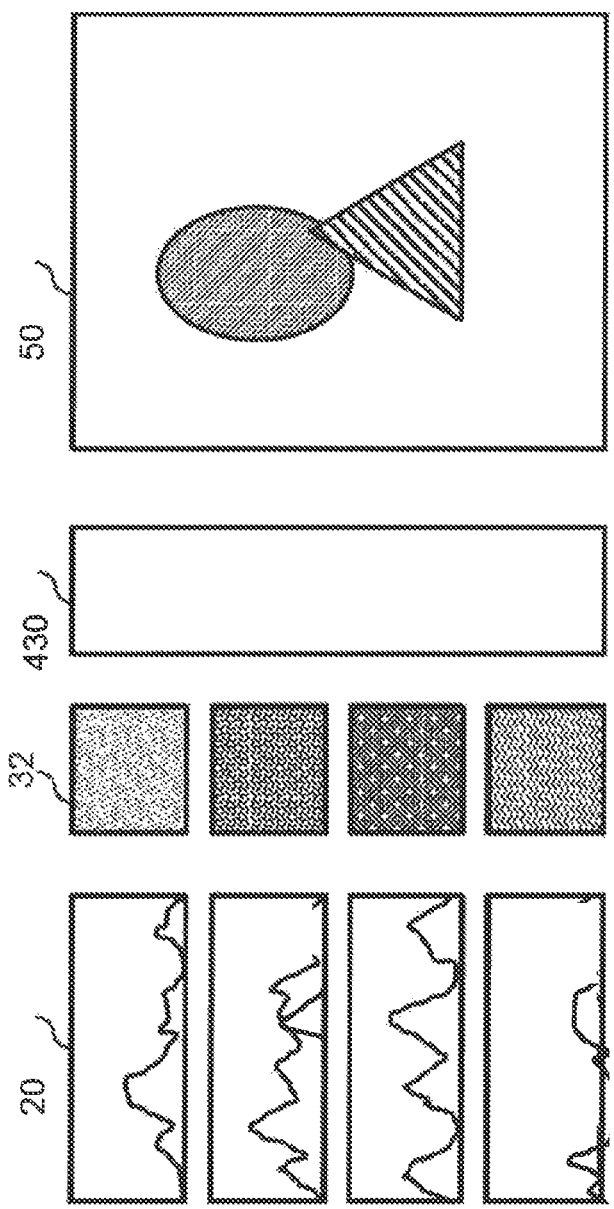

FIG. 3 shows a principal sketch of method of reconstructing a depth image 50. On the left side for different illumination patterns 20 are shown. Each illumination pattern 20 corresponds to a detected illumination pattern 32 in the field-of-view 300 which is detected by means of the respective detector pixel of light detector 220. The detected illumination patterns 32 are used in step 430 in combination with information about the respective illumination pattern 20 to reconstruct the depth image 50 of the scene visible in the field of view 300 by means of a suitable reconstruction algorithm (see above).

Figure 4:
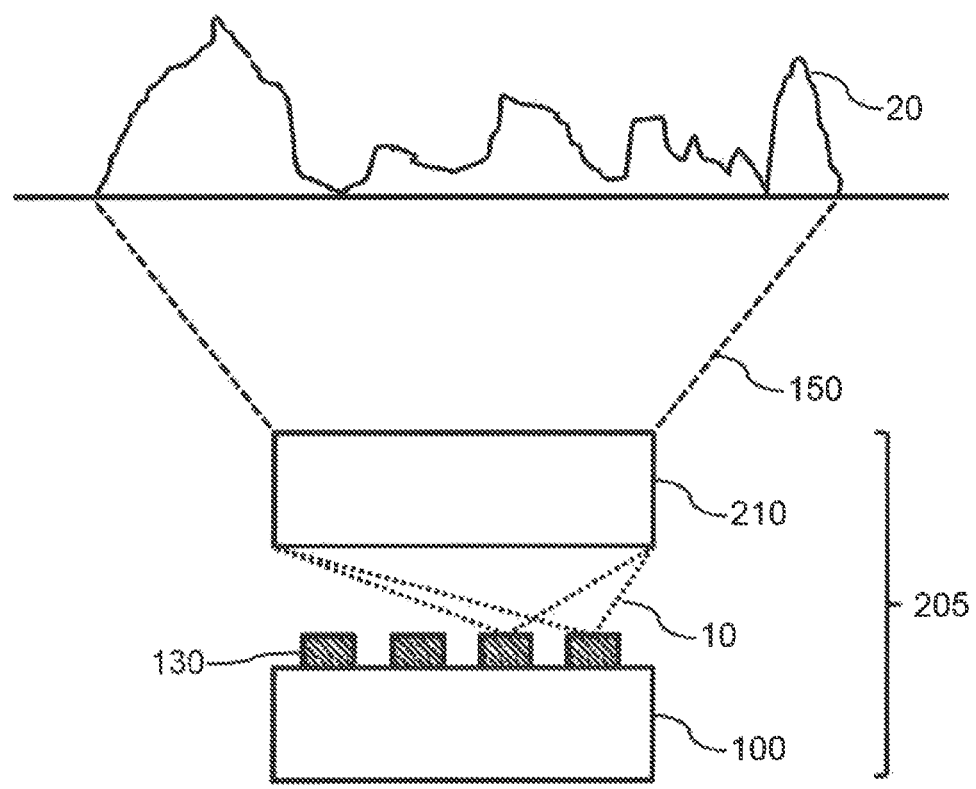

FIG. 4 shows a principal sketch of a second pattern projector 205 which may be used in a time-of-flight depth camera 200. The general configuration is similar as discussed with respect to FIG. 1. The VCSEL array 100 is in this case the switchable array in which single VCSELs 130 or groups of VCSELs 130 can be individually switched on or off. The VCSELs 130 may be combined with suitable optical devices like micro lenses in order to illuminate the optical arrangement 210. The combination of laser light emitting VCSEL 130 or group of VCSELs 130 and optical arrangement 210 is preferably such that the whole scene in the field of view 300 is illuminated by illumination patterns 20. The optical arrangement 210 comprises in this case a distortion device and one diffractive optical element. The distortion device is arranged to change the spatial arrangement of parts of the diffractive optical element in order to provide different illumination patterns 20. The combination of switchable VCSEL array 100 and optical arrangement 210 does therefore enable projection of a multitude of illumination patterns 20 which can be used to reconstruct a depth image 50 of the scene in the field of view as described in FIG. 3. The VCSEL array 100 may, for example, be a 4×2 array comprising altogether 8 groups of VCSELs (segments) which can be individually switched. The VCSEL array 100 may be arranged such that in each switching state 4 segments are simultaneously switched on. This results in 70 different switching states and therefore up to V=70 different illumination patterns 20 which can be provided by the VCSEL array 100. The optical arrangement 210 may be arranged to provide O=50 different illumination patterns. This would result in up to N=3500 different illumination patterns 20 sufficient to fulfill the 10% criteria in case of P=160*160 pixels.

Figure 5:
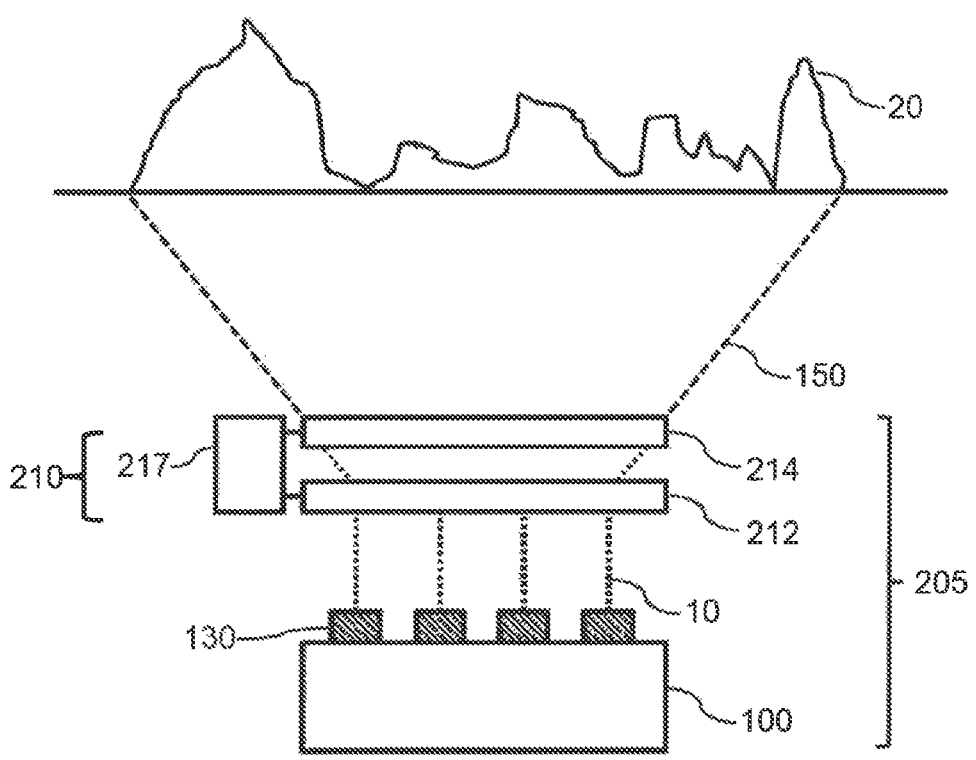

FIG. 5 shows a principal sketch of a third pattern projector 205 which can be used in a time-of-flight depth camera 200. The pattern projector 205 comprises a VCSEL array 100 which is arranged such that all VCSELs 130 simultaneously emit pulses of laser light 10. The optical arrangement comprises a first optical device 212 (e.g. first DOE) and a second optical device 214 (e.g. second DOE). A spatial relationship between the first and the second optical device 212, 214 can be changed by means of a manipulator 217. The manipulator 217 is in this embodiment arranged to rotate the first and the second optical device 212, 214 in steps of 0.5° around the common axis with respect to each other (one DOE fixed). This enables 720 different illumination patterns 20 which can be used to reconstruct a depth image 50 of the scene in the field of view 300.

Figure 6:
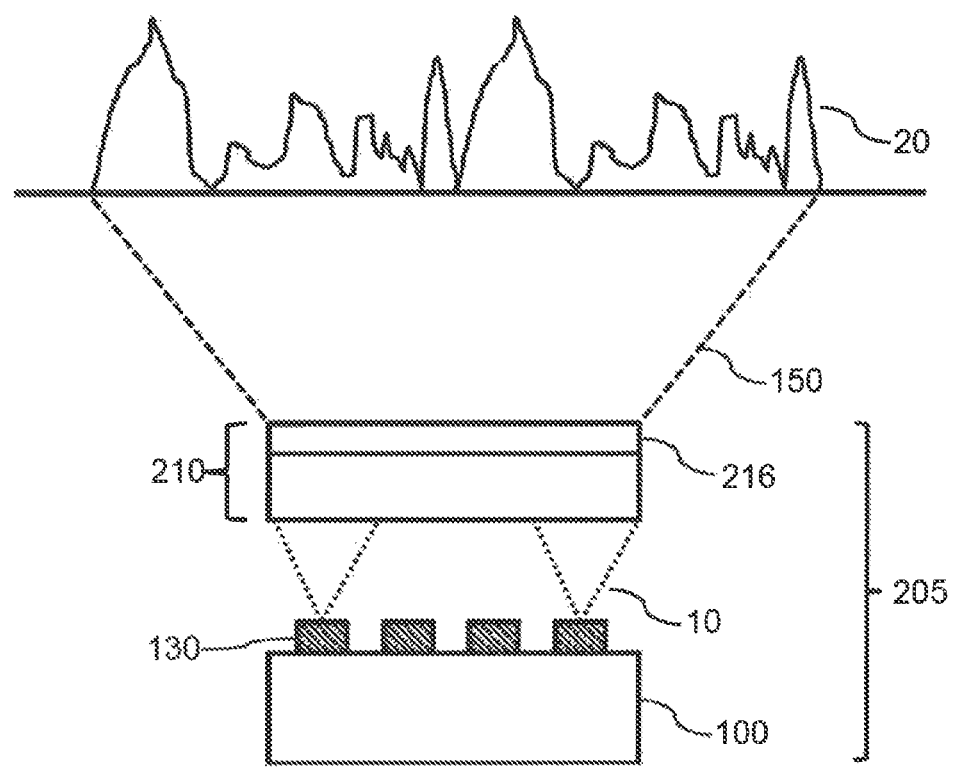

FIG. 6 shows a principal sketch of a fourth pattern projector 205 which may be used in a time-of-flight depth camera 200. The general configuration is similar as discussed with respect to FIG. 4. The VCSEL array 100 is in this case the switchable array in which single VCSELs 130 or groups of VCSELs 130 can be individually switched on or off. The VCSEL array 100 may, for example, be a 4×4 array comprising altogether 16 groups of VCSELs (segments) which can be individually switched. The VCSEL array 100 may be arranged such that in each switching state 8 segments are simultaneously switched on. The fourth pattern projector 205 further comprises an optical arrangement 210 comprising as switchable light modulator which is arranged to provide O different illumination patterns. The optical arrangement 210 further comprises a replicating optical structure 216 which is arranged to replicate the illumination patterns which can be provided by the switchable light modulator such that the different illumination pattern 20 provided in the field-of-view consists of an array of four illumination patterns provided by the switchable light modulator. The fourth pattern projector 205 is arranged to interact with a sensor 220 comprising 2×2 sensor pixels 222 (see FIG. 7). Each sensor pixels 222 is arranged to monitor one of the sub-illumination patterns in the array of four illumination patterns. This results in four images wherein each image is characterized by a sub-resolution of 160/2 by 160/2 i.e. 80 by 80 per detector pixel 222 (in case of a total resolution of 160 by 160 pixels). There are therefore 6400 pixels for each detector pixel 222. The contribution of the sensor pixels 222 is in this special embodiment D=4. 20% different illumination patterns 20 may be required in order to reconstruct one of the four quarters of the depth image 50. This results in V*O=1280 different illumination patterns which need to be provided by the combination of the VCSEL array 100 and the optical arrangement 210. The total number N of detected different illumination patterns is in this embodiment given by N=D*V*O in view of the total resolution of P=160*160. Each sensor pixel 222 detects V*O (1280 in this embodiment) patterns in order to reconstruct the part of the depth image 50 which is covered or observed by the respective sensor pixel 222. The part of the depth image 50 which is observed by a single detector pixel 222 is in this embodiment characterized by a resolution P/D. For the VCSEL array 100 it is sufficient to look at only those segments that project into the respective part of the field-of-view 300. The VCSEL array 100 may be characterized by 4 by 4 segments, then each of the quarter images would 'see' a segmented VCSEL array 110 which is 2 by 2, which can only generate V=6 different illumination patterns 20 for half segments simultaneously illuminated. The optical arrangement would then need to generate O=214 different illumination patterns 20.

For illustrative purposes different cases may be compared in case of resolution P=160 by 160:
Light detector 200: 2 by 2-4 sensor pixels 222; D=4
Need 1280 different illumination patterns 20 for each image section
VCSEL array 100: 4 by 4-16 segments, but effectively only 4 segments operate for each individual sensor pixel 222, so V=6 patterns
Optical arrangement 210: O=214 patterns to fulfil the 20% condition
Light detector 200: 1 by 1-1 sensor pixel 222; D=1
Need 5120 different illumination patterns 20
VCSEL array 100: 4 by 4-16 segments—can in principle, generate 12,870 different illumination patterns 20 with 8 segments illuminated. However the VCSEL segment patterns may be less 'useful' since they are not pseudo-random noise at the pixel scale, but large patches. It may be that the 'utility' for image reconstruction of the VCSEL patterns lies somewhere between the number of segments and the number of segment combinations. The illumination patterns may be too close to each other to qualify as different illumination pattern which be fully useful for image reconstruction, they are not noise like enough together. An option to avoid this effect is to use VCSELs 130 which are arranged in a random pattern as described above.

Optical arrangement 210: Needs virtually no different illumination pattern 20 in order to fulfill the 20% condition on this basis but actually to get fine pixel detail in the reconstructed depth image 50 about 100 different illumination patterns 20 may be provided.

Figure 7:
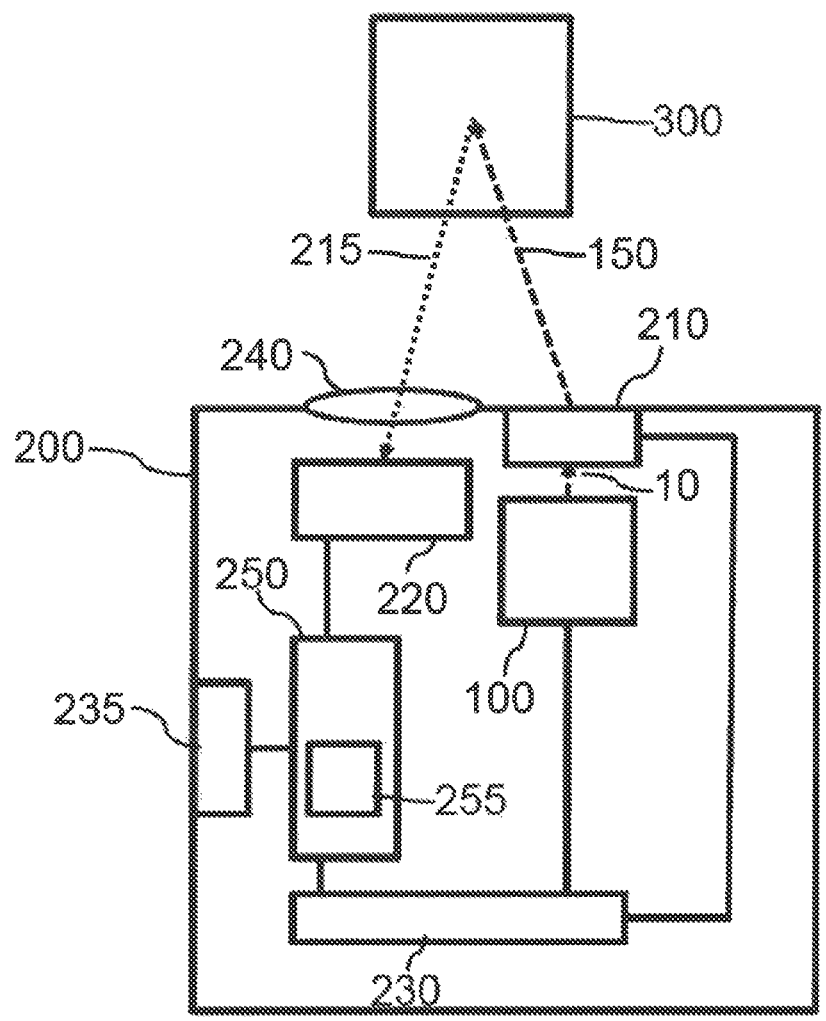

FIG. 7 shows a principal sketch of a time-of-flight depth camera 200. The time-of-flight depth camera 200 comprises a VCSEL array 100 and an optical arrangement 210. The VCSEL array 100 is arranged to emit laser light 10 which is subsequently transformed by the optical arrangement 210 to transformed laser light 150 to illuminate a field of view 300. A part of the transformed laser light 150 is reflected by the objects in the scene such that reflected laser light is received by optical imaging device 240 (e.g. lens or lens arrangement) which images the received laser light to light detector 220. The reflected laser light causes a corresponding electrical signal in the light detector 220 representing the detected illumination pattern detected in a certain moment in time. An electrical driver 230 is arranged to electrically drive the VCSEL array 100 or optionally each VCSEL 130 or sub-groups of VCSELs 130 of the VCSEL array 100 separately in order to enable a multitude of different illumination patterns 20 in the field of view 300. Furthermore, the electrical driver 230 is arranged to drive the optical arrangement 210 in order to enable a multitude of different illumination patterns 20 in the field of view 300. A controller 250 is connected with the electrical driver 230 in order to control the VCSEL array 100 and the optical arrangement 210. The controller 250 is further connected with the light detector 220 in order to receive the electrical signal caused by the reflected laser light detected by the light detector 220. The time-of-flight depth camera 200 comprises an evaluator 255 which is in this embodiment comprised by controller 250 in order to reconstruct a depth image 50 of the scene in the field of view 300 based on the multitude of illumination patterns 20 detected by means of light detector 220 and corresponding information about the illumination patterns 20 provided by the VCSEL array 100 and the optical arrangement 210. The time-of-flight depth camera 200 comprises in this embodiment an interface 235 to transfer the image data of the depth image 50. The interface 235 may alternatively or in addition be arranged to transfer raw data of the electrical signals provided by the light detector 220 in reaction to the reflected laser light received by the light detector 220. The raw data can be used to reconstruct the depth image 50.

Figure 8:
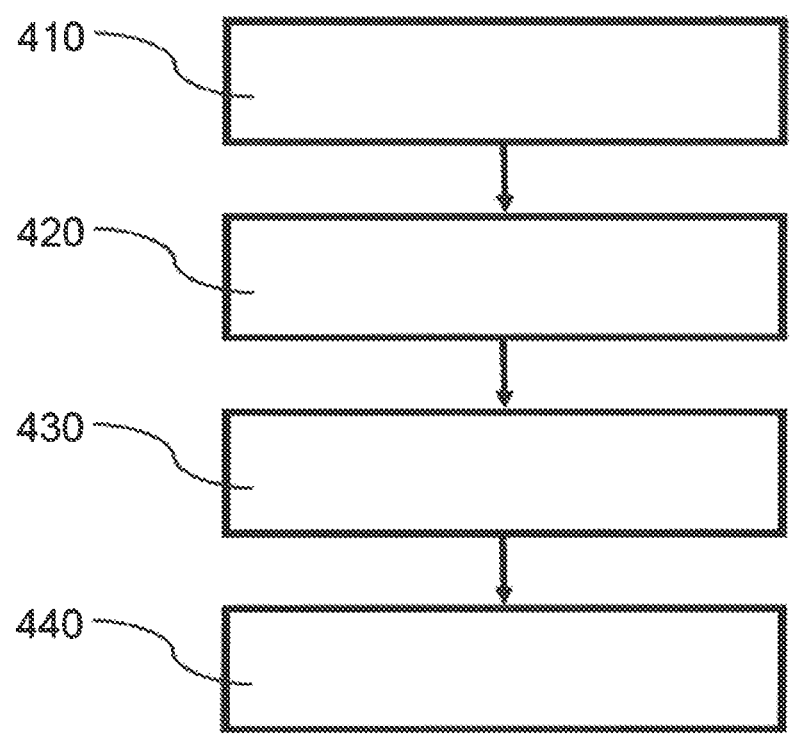

FIG. 8 shows a principal sketch of a process flow of a method of providing a depth image from a defined field of view with a resolution of a predefined number of pixels. In step 410 is an optical interaction between a VCSEL array 100 and an optical arrangement 210 changed. A number of different illumination patterns 20 are provided in step 420 by changing the optical interaction. The different illumination patterns are detected in step 430 by, for example a light detector 220 which may comprise one single detector pixel. The number of detected different illumination patterns is at least 5% of the predefined number of pixels, preferably at least 10% of the predefined number of pixels and most preferred at least 20% of the predefined number of pixels in a reference plane in the defined field-of-view. The depth image 50 of the field of view 300 is reconstructed in step 440 based on the detected different illumination patterns 20.

An optical projection system (such as 2 DOEs), incorporating an ability to generate multiple noise-like projected images which change from one pattern to another as a result of modifying the relationship between components of the optics, are used to produce the multiple projected patterns required by a, for example, single pixel time-of-flight data imaging system (Compressive Sampling imaging). One or more laser pulses are projected with each different pattern and the single 'bucket' sensor collects the resulting time-of-flight data from the reflected light. A computer reconstruction algorithm then generates the full high resolution depth image 50 from the full set of this data. The time-of-flight camera may comprise:

1. A pattern generation system whereby a VCSEL chip or chips send a pulse of light through 2 (or more) optical elements (such as DOEs) and the light diffracted by the optical elements is projected onto the scene in a field of view as a noise pattern.
2. A single pixel ToF sensor records the times and intensities of the light reflected from the whole scene in the field of view.
3. The relationship between the optical elements is altered, for example by rotating the outer optical element with respect to the inner optical element by some small amount (say 10 degrees).
4. The VCSELs send another optical pulse through the optics, a different noise image is projected on the scene and again the reflected light from the whole scene is recorded by the single pixel ToF sensor.
5. Following a complete set of optical elements position changes—for example each optical element can be rotated through an angle of 10 degree for each change and so the total number of projected patterns for 2 optical elements is 36*36=1,296—the full data set is acquired.
6. A reconstruction algorithm, which knows the full set of patterns generated by the pattern generation system takes the data set and reconstructs a high resolution depth image 50.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Any reference signs in the claims should not be construed as limiting the scope thereof.

LIST OF REFERENCE NUMERALS 10 laser light
20 illumination pattern
32 detected illumination pattern in field of view
50 depth image
100 VCSEL array
130 VCSEL
150 transformed laser light
200 time-of-flight depth camera
205 pattern projector
207 time-of-flight sensor module
210 optical arrangement
212 first optical device
214 second optical device
215 reflected laser light
216 replicating optical structure
217 manipulator
220 light detector
230 electrical driver
235 interface
240 optical imaging device
250 controller
255 evaluator
300 field-of-view
410 step of changing optical interaction
420 step of providing illumination pattern
430 step of detecting illumination pattern
440 step of reconstructing depth image

The invention claimed is:

1. A time-of-flight depth camera comprising:
a VCSEL array;
an optical arrangement;
an evaluator; and
a light detector comprising at least one detector pixel,
wherein the VCSEL array or the optical arrangement are arranged to provide different illumination patterns in a reference plane in a defined field-of-view of the time-of-flight depth camera,
wherein the light detector is arranged to detect the different illumination patterns,
wherein the evaluator is arranged to reconstruct a depth image of the field of view with a resolution of a predefined number of pixels P based on the detected different illumination patterns,
wherein a number of the detected different illumination patterns N is at least 5% of the predefined number of pixels P,
wherein the VCSEL array is an addressable VCSEL array,
wherein the VCSEL array is arranged to provide different illumination patterns by addressing different VCSELs of the VCSEL array,
wherein the optical arrangement comprises a replicating optical structure,
wherein the replicating optical structure is arranged to replicate a light pattern provided by the VCSEL array across the illumination pattern such that the illumination pattern consists of two or more sub-illumination patterns,
wherein the detector is arranged such that each detector pixel detects a corresponding sub-illumination pattern,
wherein the number of detected different illumination patterns N is determined by a number of detector pixels D and a number of provided different illumination patterns, and
wherein the number of provided different illumination patterns is given by a product V*O of a number of different illumination patterns provided by the addressable VCSEL array V and a number of different illumination patterns provided by optical arrangement O, wherein V is chosen between 4 and 0.7*N, and wherein O is chosen between 2 and 0.7*N.

2. The time-of-flight depth camera according to claim 1, wherein the different illumination patterns are pseudo random illumination patterns.

3. The time-of-flight depth camera according to claim 1, wherein the VCSELs of the VCSEL array are arranged in a random pattern such that the number of different illumination patterns provided by the VCSEL array is increased.

4. A time-of-flight depth camera comprising:
a VCSEL array;
an optical arrangement;
an evaluator; and
a light detector comprising at least one detector pixel, wherein the VCSEL array or the optical arrangement are arranged to provide different illumination patterns in a reference plane in a defined field-of-view of the time-of-flight depth camera,
wherein the light detector is arranged to detect the different illumination patterns,
wherein the evaluator is arranged to reconstruct a depth image of the field of view with a resolution of a predefined number of pixels P based on the detected different illumination patterns,
wherein a number of the detected different illumination patterns N is at least 5% of the predefined number of pixels P,
wherein the VCSEL array is an addressable VCSEL array,
wherein the VCSEL array is arranged to provide different illumination patterns by addressing different VCSELs of the VCSEL array,
wherein the optical arrangement comprises a replicating optical structure,
wherein the optical arrangement is arranged to provide different illumination patterns by changing an optical property of the optical arrangement,
wherein the number of detected different illumination patterns N is determined by a number of detector pixels D and a number of provided different illumination patterns, and
wherein the number of provided different illumination patterns is given by a product V*O of a number of different illumination patterns provided by the addressable VCSEL array V and a number of different illumination patterns provided by optical arrangement O, wherein V is chosen between 4 and 0.7*N, and wherein O is chosen between 2 and 0.7*N.

5. The time-of-flight depth camera according to claim 4, wherein the optical arrangement comprises a first optical element and a second element, and wherein the optical arrangement is arranged to change a spatial relationship between the first optical element and the second optical element.

6. The time-of-flight depth camera according to claim 5, wherein the first optical element is a first diffractive optical element, and wherein the second optical element is a second diffractive optical element.

7. The time-of-flight depth camera according to claim 4, wherein the optical arrangement comprises a spatial light modulator or a micromirror device for providing the different illumination patterns.

8. The time-of-flight depth camera according to claim 4, wherein the light detector comprises less than 10 detector pixels.

9. The time-of-flight depth camera according to claim 4, wherein the number of detected different illumination patterns N is less than the predefined number of pixels P.

10. A method of providing a depth image from a defined field of view with a resolution of a predefined number of pixels P, the method comprising the steps of:
changing an optical interaction between a VCSEL array and an optical arrangement, wherein the VCSEL array is an addressable VCSEL array,
providing a number of different illumination patterns by changing the optical interaction,
detecting the different illumination patterns, wherein the number of detected different illumination patterns N is at least 5% of the predefined number of pixels P in a reference plane in the defined field-of-view,
reconstructing the depth image of the field of view based on the detected different illumination patterns,
providing different illumination patterns by addressing different VCSELs of the addressable VCSEL array,
replicating by means of a replicating optical structure comprised by the optical arrangement a light pattern provided by the addressable VCSEL array across the illumination pattern such that the illumination pattern consists of two or more sub-illumination patterns, and
detecting by each detector pixels a corresponding sub-illumination pattern,
wherein the number of detected different illumination patterns N is determined by a number of detector pixels D and a number of provided different illumination patterns, and
wherein the number of provided different illumination patterns is given by a product V*O of a number of different illumination patterns provided by the addressable VCSEL array V and a number of different illumination patterns provided by optical arrangement O, wherein V is chosen between 4 and 0.7*N, and wherein O is chosen between 2 and 0.7*N.

11. A method of providing a depth image from a defined field of view with a resolution of a predefined number of pixels P, the method comprising the steps of:
changing an optical interaction between a VCSEL array and an optical arrangement, wherein the VCSEL array is an addressable VCSEL array,
providing a number of different illumination patterns by changing the optical interaction,
detecting the different illumination patterns, wherein the number of detected different illumination patterns N is at least 5% of the predefined number of pixels P in a reference plane in the defined field-of-view,
reconstructing the depth image of the field of view based on the detected different illumination patterns,
providing different illumination patterns by addressing different VCSELs of the addressable VCSEL array, and
providing different illumination patterns by changing an optical property of the optical arrangement,
wherein the number of detected different illumination patterns N is determined by a number of detector pixels D and a number of provided different illumination patterns, and wherein the number of provided different illumination patterns is given by a product V*O of a number of different illumination patterns provided by the addressable VCSEL array V and a number of different illumination patterns provided by optical arrangement O, wherein V is chosen between 4 and 0.7*N, and wherein O is chosen between 2 and 0.7*N.

* * * * *